United States Patent [19]

Kawasaki et al.

[11] 3,771,079

[45] Nov. 6, 1973

[54] TUNING DEVICE EFFECTING SIMULTANEOUS VARIATION OF INDUCTANCE AND CAPACITANCE

[75] Inventors: Kazuo Kawasaki, Ohmiya-shi; Kazuo Arai, Saitama-Ken, both of Japan

[73] Assignee: Nissan Denshi Kabushiki Kaisha, Ohmiya-shi, Saitama-ken, Japan

[22] Filed: Feb. 25, 1972

[21] Appl. No.: 229,344

[30] Foreign Application Priority Data

Mar. 2, 1971 Japan ............................... 46/10378

[52] U.S. Cl. ................................... 334/70, 334/74

[51] Int. Cl. ............................................ H03j 3/22

[58] Field of Search ............. 334/69, 70, 74, 75–77; 336/130

[56] References Cited

UNITED STATES PATENTS

| | | | |
|---|---|---|---|
| 2,155,404 | 4/1939 | Craft | 334/70 X |
| 2,206,820 | 7/1940 | Mydlil | 334/70 X |
| 3,079,572 | 2/1963 | Janke et al. | 334/70 X |
| 3,059,195 | 10/1962 | Lyman | 334/70 X |
| 2,856,780 | 10/1958 | Hemphill et al. | 334/70 X |

*Primary Examiner*—Paul L. Gensler
*Attorney*—Thomas B. Graham

[57] ABSTRACT

A tuning device for radio receivers including an inductor having a movable core and a variable condenser coupled one to the other for simultaneous operation to tune the receiver.

2 Claims, 3 Drawing Figures

TUNING DEVICE EFFECTING SIMULTANEOUS VARIATION OF INDUCTANCE AND CAPACITANCE

This invention relates to radio receivers and more specifically to a novel and improved tuning device which is particularly useful for car radios.

Tuning devices for radio receivers have generally involved the use of variable condensers or variable inductors, the latter employing movable magnetic cores usually of ferrite. While variable inductors or mu-tuners have generally been used in car radios, three to six cores were required which not only made the tuner bulky, but the torque required to operate the cores was large in comparison to the torque required to operate a capacitive tuner.

The tuner in accordance with this invention overcomes the difficulties heretofore encountered with both capacitive and inductive tuners and provides a novel and improved tuner that affords a high degree of stability and reliability, can be made far more compact than prior tuners and requires little driving torque. The characteristics are particularly advantageous in present car radios which usually include a tape player occupying a material amount of space. Since the space available in automobiles for installation of a radio receiver is limited, this invention enables the assembly of both the radio and tape player within a relatively small housing since the new and improved tuner can be greatly reduced in size, moreover the tuner can be mounted in any desired position and location and since the driving torque is small it can be readily driven by a dial cord and therefore need not be positioned in close proximity to the tuning knob.

The improved tuner includes the combination of a miniaturized tuning condenser and a variable inductor, the single ferrite core of which can be made very small. The core of the inductor and the capacitor are mechanically coupled for simultaneous operation and since only a single core is required and the condenser is small, very little torque is required for operation thereof and a tuning band of 535 KHz to 1650 KHz is easily obtainable.

The above and other objects and advantages of the invention will become more apparent from the following description and accompanying drawings forming part of this application.

IN THE DRAWINGS

Figure 1:
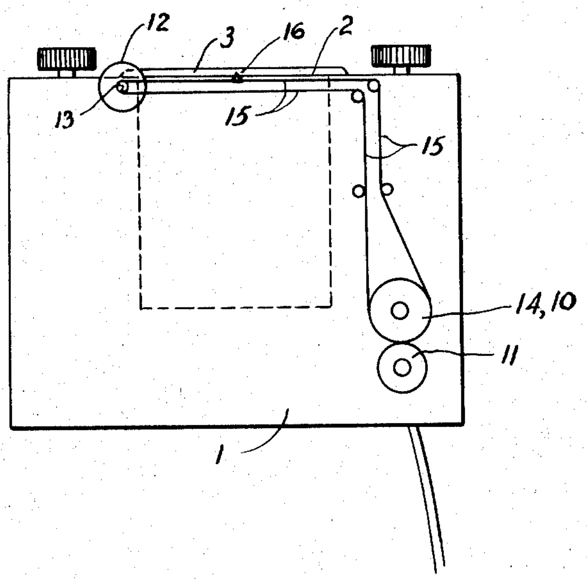
FIG. 1 is a partially diagrammatic plan view of a car radio and tape player embodying a tuner in accordance with the invention.

Referring now to the drawings, the car radio and tape player embodying the tuner in accordance with the invention is contained within the housing 1. The front face of the housing includes in addition to volume and tone control knobs, a door 2 for insertion of a magnetic tape cartridge or cassette, a dial scale 3 calibrated in frequency and having a movable pointer 16 and a tuning knob 12. It is evident that the major portion of the housing is occupied by the tape player and radio circuitry.

Figure 2:
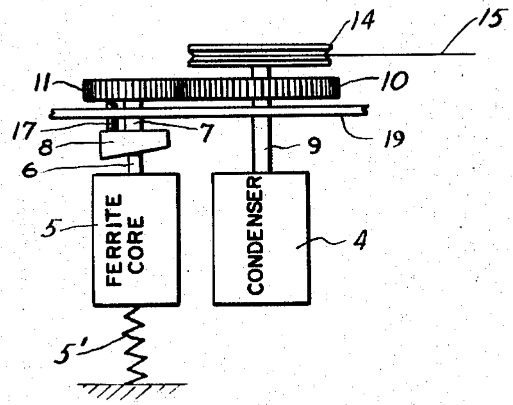
FIG. 2 is a side elevation in partially diagrammatic form of the tuner in accordance with the invention.
Figure 3:
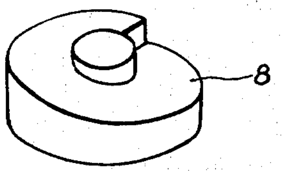
FIG. 3 is a perspective view of a cam for operating the ferrite core of the tuner shown in FIGS. 1 and 2.

The tuner, shown more clearly in FIG. 2, is carried by the plate 19 and includes a small variable condenser 4 and a movable ferrite core 5, the surrounding inductor having been omitted for purposes of clarity. The shaft 9 of the condenser 4 extends through plate 19 and carries spur gear 10 and a grooved pulley 14. The ferrite core 5, which may be 10 MM in diameter and 15 MM long for conventional AM frequencies, has a shaft 6 extending upwardly thereof and bears against the inclined bottom surface of cam 8, the cam having been inserted in FIG. 3 to show the camming surface. Cam 8 is carried by a shaft 7 extending through the plate 19 and carrying a spur gear 11 which meshes with the spur gear 10. A spring 5' urges the core 5 and shaft 6 upwardly so that the latter will follow the camming surface on cam 8. An adjusting screw 17 threadably engaging the plate 19 and bearing against the upper side of the cam 8 to adjust the position of core 5 relative to condenser 4 in order to effect tuning over the desired frequency range.

With the foregoing arrangement, rotation of the grooved wheel 14 will simultaneously rotate condenser 4 and vertically displace the core 5 and very little torque is required to effect such rotation. Inasmuch as the tuner is small and requires little effort to drive it, it can be placed to the rear of the housing 1, in close proximity to the incoming antenna lead 18 and driven by a suitable dial cord 15. In this case the dial cord 15 which is maintained under tension engages the groove in pulley 14, is guided outwardly and along the front face of housing 1 by idler pulleys and engages the groove 13 on the shaft of the tuning knob 12. The slidably mounted pointer 16 is coupled with the dial cord 15 so that as the knob 12 is rotated to rotate the pulley 14, the pointer will move along the dial 3 to indicate the tuned frequency.

The use of both a variable condenser and a variable inductor in combination greatly increases the sensitivity and selectivity of the receiver since the condenser offers the most effective portion of its capacitance range.

While only one embodiment of the invention has been illustrated and described, it is understood that alternative modifications and changes may be made without departing from the scope and spirit thereof as defined by the appended claims.

What is claimed is:

1. A tuning device for radio receivers comprising an inductor having a movable magnetic core assembly, a variable condenser and means coupling said movable core and variable condenser to effect simultaneous operation thereof for tuning said receiver, said variable condenser including a rotatable shaft and said magnetic core assembly including a cam rotatably carried by a shaft directly coupled with the first said shaft, and means engaging said cam and core to displace the latter axially as the cam is rotated, said coupling means including a pair of meshed spur gears with one gear being carried by said condenser shaft and the other gear being carried by said cam shaft.

2. A tuning device according to claim 1 wherein said cam is in the shape of a disc concentrically carried by said cam shaft with one side of said disc having an inclined annular surface and said engaging means includes a shaft connected at one end to said core, and spring means urging the other end of the last said shaft against said one side of said cam.

* * * * *